US009178721B2

(12) United States Patent
Reynolds et al.

(10) Patent No.: US 9,178,721 B2
(45) Date of Patent: Nov. 3, 2015

(54) INFERRING CAUSAL PATHS IN A DISTRIBUTED COMPUTING ENVIRONMENT

(75) Inventors: Patrick A. Reynolds, Durham, NC (US);
Janet L. Wiener, Palo Alto, CA (US);
Marcos K. Aguilera, Palo Alto, CA (US); Jeffrey C. Mogul, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1026 days.

(21) Appl. No.: 11/148,482

(22) Filed: Jun. 9, 2005

(65) Prior Publication Data

US 2006/0282546 A1 Dec. 14, 2006

(51) Int. Cl.
*G06F 15/16* (2006.01)
*H04L 12/66* (2006.01)
*H04L 12/24* (2006.01)
*H04L 29/08* (2006.01)

(52) U.S. Cl.
CPC ............. *H04L 12/66* (2013.01); *H04L 41/0631* (2013.01); *H04L 67/10* (2013.01)
USPC ........... 709/232; 709/201; 709/206; 709/238; 709/240

(58) Field of Classification Search
CPC ...... H04L 12/66; H04L 41/0631; H04L 67/10
USPC ................. 709/201–207, 232–233, 238–240, 709/223–226
See application file for complete search history.

(56) References Cited

U.S. PATENT DOCUMENTS

| 5,218,676 | A * | 6/1993 | Ben-Ayed et al. | 709/240 |
|---|---|---|---|---|
| 6,529,891 | B1 * | 3/2003 | Heckerman | 706/52 |
| 6,529,960 | B2 * | 3/2003 | Chao et al. | 709/238 |
| 6,590,867 | B1 * | 7/2003 | Ash et al. | 709/240 |
| 6,708,163 | B1 | 3/2004 | Kargupta et al. | |
| 6,925,431 | B1 * | 8/2005 | Papaefstathiou | 709/223 |
| 7,007,102 | B2 * | 2/2006 | Billhartz et al. | 709/232 |
| 7,027,951 | B1 * | 4/2006 | MacCormick et al. | 709/201 |
| 7,254,646 | B2 * | 8/2007 | Aguilera et al. | 709/249 |
| 7,286,962 | B2 * | 10/2007 | Di Palma et al. | 709/224 |
| 7,460,487 | B2 * | 12/2008 | Hao et al. | 709/224 |
| 8,332,538 | B2 * | 12/2012 | Tan et al. | 709/201 |
| 8,346,960 | B2 * | 1/2013 | Spatscheck et al. | 709/238 |
| 2004/0111706 | A1 | 6/2004 | Mogul et al. | |
| 2005/0015424 | A1 | 1/2005 | Aguilera et al. | |
| 2005/0091177 | A1 * | 4/2005 | Przytula | 706/52 |

OTHER PUBLICATIONS

U.S. Appl. No. 10/950,025, filed Sep. 24, 2004, Mogul et al.
Aguilera, M. et al., "Performance Debugging for Distributed Systems of Black Boxes", SOSP 03, Oct. 19-22, 2003, Bolton Landing, New York; 16 pages.
Shah, R. et al., "Energy Aware Routing for Low Energy Ad Hoc Sensor Networks", Berkeley Wireless Research Center, University of California, Berkeley, 6 pages.

*Primary Examiner* — Bharat N Barot
(74) *Attorney, Agent, or Firm* — Fulbright & Jaworski L.L.P.

(57) ABSTRACT

According to one embodiment, a method comprises evaluating messages between nodes of a distributed computing environment. Based on timing relationships of the messages, probability of causal links between pairs of messages determined. Based on the determined probability, at least one causal path comprising a plurality of causal links is inferred. Further, an overall probability that the inferred causal path is accurate is determined. In certain embodiments, the overall probability is output for the corresponding causal path to provide an indication of the confidence of the accuracy of such inferred causal path.

23 Claims, 5 Drawing Sheets

(56) References Cited

OTHER PUBLICATIONS

Chang, F. et al., "Energy-driven Statistical Profiling: Detecting Software Hotspots", Compaq Western Research Laboratories, 11 pages.

Chase, J. et al., "Managing Energy and Server Resources in Hosting Centers", Dept. of Computer Science, Duke University, 14 pages.
Intel Developer Forum—Spring 2003, 37 pages.

* cited by examiner

INFERRING CAUSAL PATHS IN A DISTRIBUTED COMPUTING ENVIRONMENT

FIELD OF THE INVENTION

The following description relates generally to systems and methods for inferring causal paths in distributed computing environments, and more particularly to systems and methods for inferring causal paths from messages communicated between nodes of a distributed computing environment.

DESCRIPTION OF RELATED ART

Many commercially-important systems, especially Web-based applications, are composed of a number of communicating components. These systems are often structured as distributed systems, with components running on different processors or in different processes. For example, a multi-tiered system may process requests from Web clients that flow through a Web-server front-end and then to a Web application server. The application server may then call a database server, for example, or other types of services such as for authentication, name service, credit-card authorization, or customer relationship management or other support functions.

Depending on the particular granularity under analysis, a "distributed computing environment" may refer to intercommunicating computers across a network, intercommunicating processes within a single computer system, or even intercommunicating software modules, components, or objects within a given software application, as examples. Accordingly, the term "distributed computing environment" (or "distributed computing system"), as used herein, is not intended to be limited to multiple computers that are remote from each other, except when accompanying language specifies this type of arrangement. Further, the "nodes" of a distributed computing environment may refer to any intercommunicating objects of a given system. For instance, depending on the granularity at which a system is being analyzed, each "node" may be separate clusters of computers, separate individual computers, separate processors implemented on one or more computers, or separate processes executing on a single host, as examples. Both local-area distributed systems and wide-area distributed systems exist. A wide-area distributed system (e.g., nodes coupled via a wide area network) differs from a local-area distributed system (e.g., nodes coupled via a local area network) in that communication over such wide-area distributed system takes significant time. That is, in a wide-area distributed system, such as nodes coupled via a wide area network (e.g., the Internet), measurable delays in messages between the nodes exist such that the send time of a message from one node does not equal its receive time at another node.

Many distributed applications, particularly wide-area distributed applications, are challenging to debug, optimize, and maintain. Wide-area distributed systems are particularly difficult to build and deploy because traditional debugging tools do not scale across multiple processes, machines, and administrative domains. Compared to local-area distributed systems, wide-area distributed systems introduce new sources of delays, such as high network latency and low bandwidth. Furthermore, the sheer size of a wide-area system can make it daunting to find and debug underperforming nodes or to examine event traces. Often, programmers have trouble understanding the communications structure of a complex distributed system, and have trouble isolating the specific sources of delays or discriminating between processing delays and network delays.

To aid in analyzing distributed systems, it becomes desirable to determine the causal structure (or causal path) and timing of communications in such systems. In general, a causal path refers to a sequence of events, such as messages (e.g., network messages) between nodes of a distributed system, in which each event is caused by the one before it. That is, the causal path defines an interrelationship of events in that it defines a series of events and specifies which event caused which other event. Thus, for example, a given causal path may specify that a node A communicated a message to a node B which in turn caused node B to communicate a message to a node C. Thus, a causal path is one way to express performance, interdependencies, and communication patterns in a distributed system. For instance, the amount of time spent at each node and/or amount of resources consumed by each node in the causal path may be collected and used for evaluating the performance of the causal path. Accordingly, it may be recognized that node B of the above exemplary causal path is underperforming in some manner. Further, by analyzing various causal paths, it may be recognized that node B underperforms when its action is caused by node A, but not when its action is caused by some other node. Causal paths and associated information collected for each node of a causal path may be used in any number of ways for evaluating the distributed system.

Various techniques have been proposed for determining causal paths in systems. Some techniques use instrumentation implemented within the distributed system and/or a priori knowledge of the system's nodes to determine a causal path. Other techniques attempt to infer causal paths by, for example, analyzing messages between the nodes of the distributed system. Traditional techniques generally require either a homogeneous implementation environment or more intrusive instrumentation for determining causal paths. Because implementing instrumentation in a distributed system is undesirably intrusive and often complex, it is often desirable to use a technique for inferring causal paths of a distributed system by analyzing messages between the nodes of such system. M. K. Aguilera, J. C. Mogul, J. L. Wiener, P. Reynolds, and A. Muthitacharoen, "Performance debugging for distributed systems of black boxes", *Proc. SOSP*-19, Bolton Landing, N.Y., October 2003, describes two techniques for inferring causal paths from communication traces in a distributed system: 1) a nesting algorithm and 2) a convolution algorithm. The convolution algorithm is very computationally intensive and is undesirably slow for determining causal paths for many applications, such as for real-time applications. The nesting algorithm requires strict call-return semantics in the systems being traced and requires (or infers) a pairing between each call message and a return message. While many systems employ such call-return semantics, this is not true for all distributed systems, and thus undesirably limits the applicability of the nesting algorithm. Further, the nesting algorithm does not address the ambiguity inherent in inferring causal paths. For instance, rather than assigning a probability score to a determined causal path (or presenting a plurality of possible alternative causal paths with each assigned a corresponding probability score), the nesting algorithm determines the most likely causal path and presents such causal path as being accurate (rather than providing an indication of how confident the algorithm is that such causal path is accurate based on the inferences made by the algorithm).

Thus, a desire exists for a technique for inferring a causal path that is efficient, does not require a priori knowledge about the nodes of the distributed system under analysis, is not limited to particular messaging semantics (such as call-return semantics), and provides one or more inferred causal paths with a corresponding indication of a probability score that reflects how confident the inferring technique is regarding the existence of such inferred causal path(s).

DETAILED DESCRIPTION

Embodiments of the present invention provide techniques for inferring causal paths from traces of the communication events (messages) in a distributed system. In certain embodiments, the paths in an inferred causal path are annotated with performance information, such as an indication of the time spent at each node of the causal path and/or an indication of the amount of resources consumed by each node of the causal path.

Certain embodiments provided herein for inferring a causal path utilize an algorithm that determines possible causes for each message in a trace based on the message's proximity in time to other messages in the trace. The time delay between the receipt of a message by a given node and the given node sending a message to another node is modeled using common service-time distributions, which the algorithm uses to assign a probability to each "causal link" between two messages (e.g., it assigns a probability that Message A-to-B caused message B-to-C). Such causal links are combined to form entire causal paths encapsulating all processing and communication that occur in response to each class of incoming request. As used herein, a message A-to-B refers to a particular message, for example a network packet, sent by A and received at B. "A-to-B caused B-to-C" is an example of a "causal link," which describes (with a probability) the likelihood that the arrival of one message (e.g., packet) from A to B caused the transmission of a later message (e.g., packet) from B to C. Thus, both "messages" (e.g., message A-to-B) and "causal links" (e.g., causal link A-B to B-C) are referred to herein.

According to one embodiment, an algorithm for inferring a causal path is implemented to evaluate messages between nodes of a distributed computing environment. Based on timing relationships of the messages, the algorithm determines probability of a causal link between two or more of the messages, and based on the determined probability, the algorithm infers at least one causal path comprising a plurality of messages and causal links. The algorithm presents the at least one causal path and an indication of confidence as to the accuracy of the inferred causal path. In certain embodiments, the indication of confidence is presented as a probability that the inferred causal path is accurate.

In another embodiment, an algorithm is implemented to receive a trace of communication messages between nodes in a distributed computing environment. The algorithm evaluates the trace of communication messages to infer at least one causal path, wherein the algorithm does not require that the communication messages adhere to call-return semantics. Based on timing relationships of the messages, the algorithm determines a probability of a causal link between the messages, and based on the determined probability, the algorithm forms at least one causal path comprising a plurality of messages and causal links.

Figure 1:
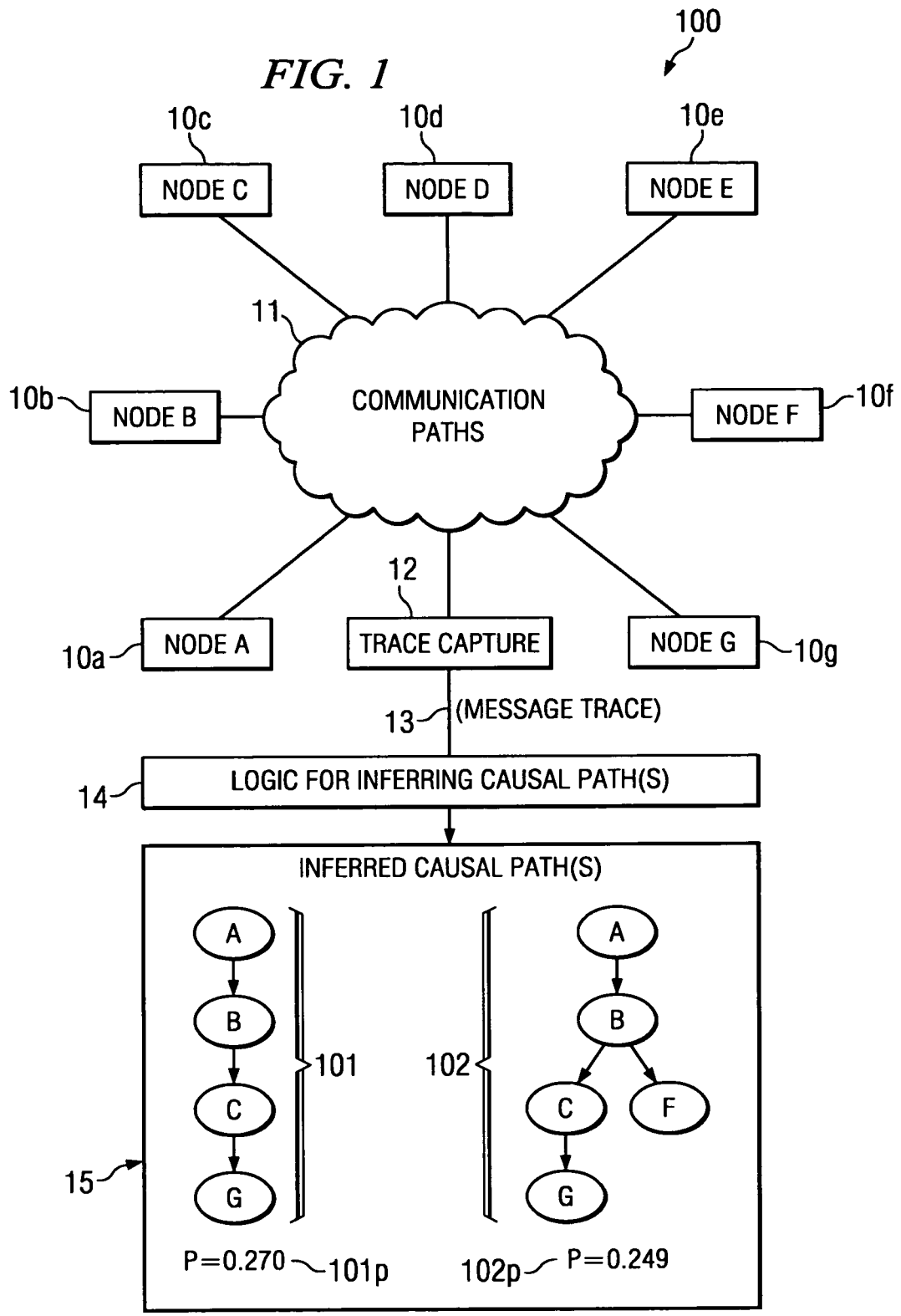
FIG. 1 shows an exemplary system in which embodiments of the present invention may be implemented.

FIG. 1 shows an exemplary system 100 in which embodiments of the present invention may be implemented. System 100 comprises a distributed computing environment that includes nodes 10A-10G that are communicatively coupled via communication paths 11. While 7 nodes are shown in the exemplary system 100 for simplicity, it should be understood that any number of intercommunicating nodes (more or fewer than 7) may exist in a given distributed computing system under analysis, and application of embodiments of the present invention are not restricted as to the number of nodes within a distributed computing system. As described above, such "distributed computing environment" may refer to a system at any granularity. For instance, nodes 10A-10G may be intercommunicating computers across a network, intercommunicating processes within a single computer system, or even intercommunicating software modules, components, or objects within a given software application, as examples.

Again, the term "distributed computing environment" (or "distributed computing system"), as used herein, is not intended to be limited to multiple computers that are remote from each other, except when accompanying language specifies this type of arrangement. Similarly, the nodes 10A-10G of the distributed computing environment may refer to any intercommunicating objects of a given system. For instance, depending on the granularity at which a system is being analyzed, each node may be separate clusters of computers, separate individual computers, separate processors implemented on one or more computers, or separate processes executing on a single host, as examples. Embodiments of the present invention may be employed to analyze local-area distributed systems and/or wide-area distributed systems. Depending on the granularity of the distributed computing environment under analysis, communication paths 11 may include paths along a communication network, such as a local area network (LAN), the Internet or other wide area network (WAN), public or private-switched telephony network, and/or wireless network, as examples; communication paths 11 may include paths (e.g., buses) within a single computer system; and/or communication paths 11 may include paths between intercommunicating objects within a single software process, as examples. A single distributed computing system may actually contain a mix of intercommunicating hosts and intercommunicating software modules. That is, different levels of tracing may occur in different parts of the system, and embodiments of the message-linking algorithm described herein may be utilized for any such system.

Trace capture logic 12, such as a sniffer, interposition library on all socket API calls, or other logic now known or later developed for capturing messages, is implemented to identify messages communicated between the nodes 10A-10G. The resulting message trace 13 is supplied to logic 14 for inferring causal path(s) for the distributed computing environment under analysis according to the techniques described further herein. Embodiments of the present invention may be employed for implementing logic 14 for inferring the causal paths. As described further herein, such logic 14 infers the causal paths based on analysis of the received message trace 13 identifying messages between the nodes 10A-10G. The resulting causal paths 15 inferred by logic 14 may be stored (e.g., to computer-readable media, such as a hard drive, floppy drive, optical drive, RAM, etc.) and/or presented as output to an output device, such as a display or printer as examples.

In the illustrative example shown in FIG. 1, the inferred causal paths 15 include causal paths 101 and 102. Causal path 101 is an inferred path in which node 10A communicated with node 10B, which caused node 10B to in turn communicate with node 10C, which caused node 10C to in turn communicate with node 10G. Causal path 102 is an inferred path in which node 10A communicated with node 10B, which caused node 10B to in turn communicate with node 10F and with node 10C, which caused node 10C to in turn communicate with node 10G. In certain embodiments, accompanying information, such as time delays at each node, amount of resources consumed by each node, etc., may be further included for each causal path. Additionally, as described further herein, in certain embodiments logic 14 provides an indication of its confidence that a given inferred causal path is accurate. That is, because the causal paths are inferred by logic 14 based on its analysis of messages communicated between the nodes, logic 14 is not absolutely sure of the resulting inferred causal paths. In the example shown in FIG. 1, a probability 101P is provided by logic 14 for the inferred causal path 101, and a probability 102P is provided by logic 14 for the inferred causal path 102. These exemplary probabilities, and techniques that may be employed by logic 14 for arriving at such probabilities in certain embodiments, are described further below.

Figure 2A:
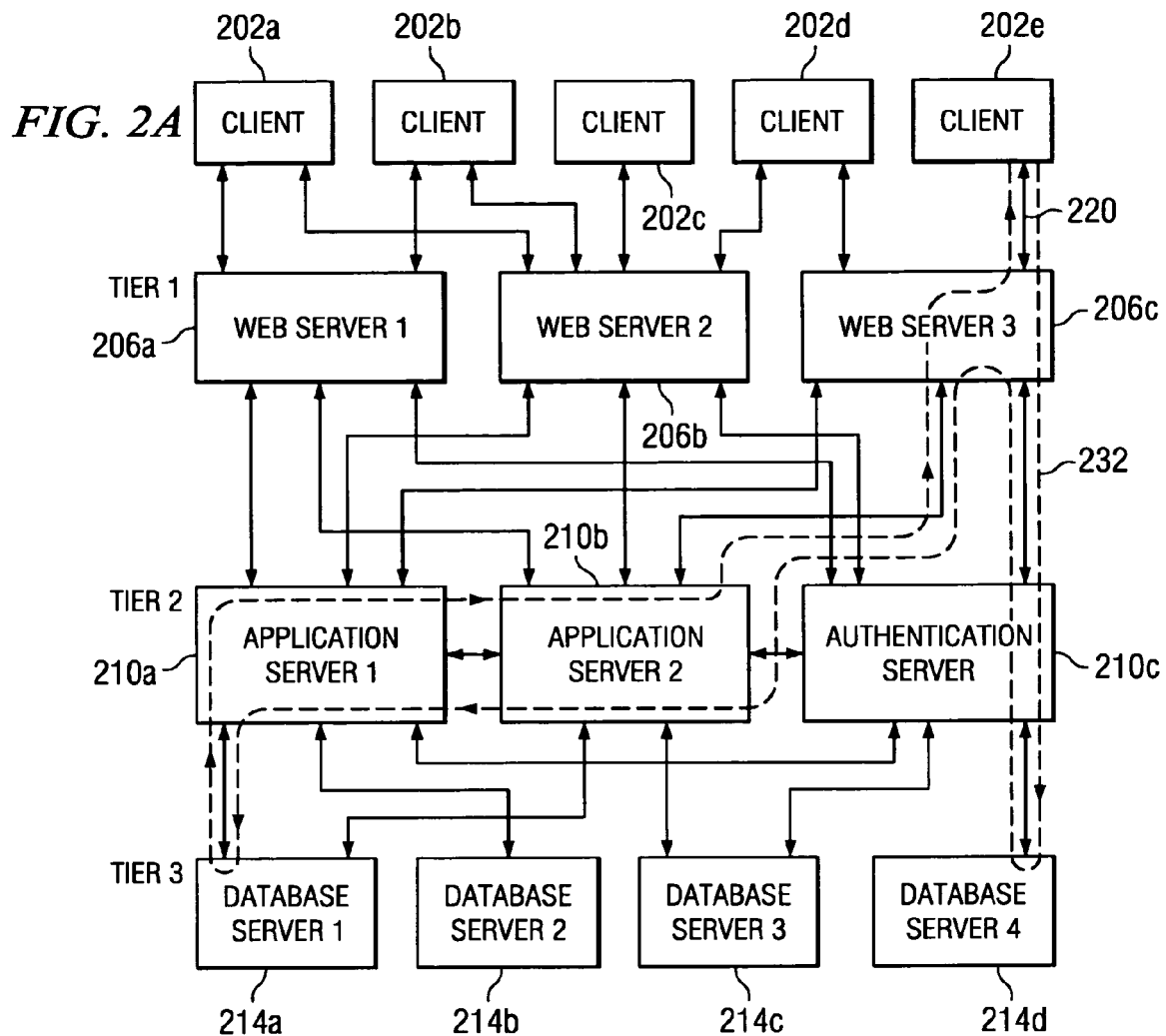
FIGS. 2A-2B show an example of a specific distributed computing environment and corresponding causal path pattern that may exist within such environment, wherein embodiments of the present invention may be employed to analyze such distributed computing environment and infer the causal path.
Figure 2B:
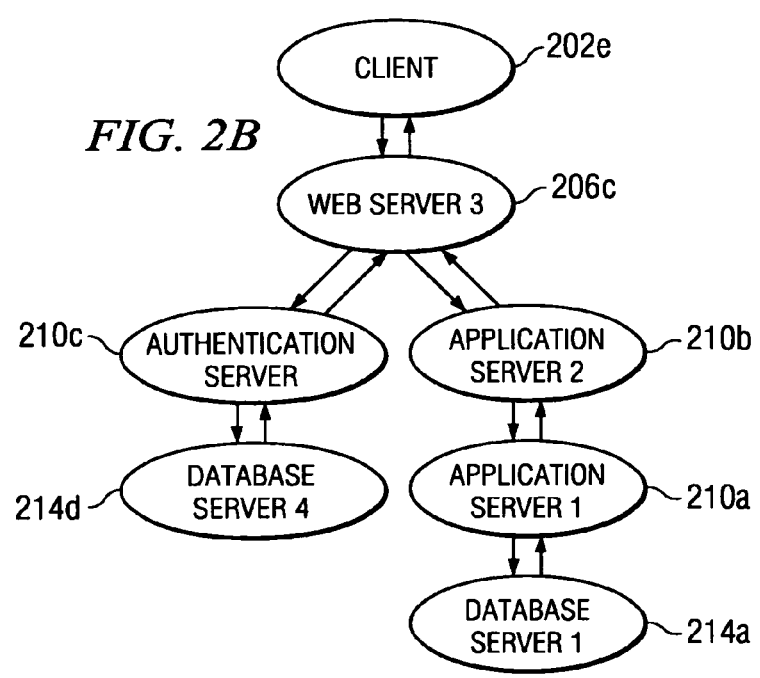

An example of a specific distributed computing environment and corresponding causal path pattern that may exist within such environment is shown in FIGS. 2A and 2B. The solid, directional lines between the nodes in FIG. 2A represent communication activity between the nodes. For example, lines 220 represent bi-directional communication activity between client 202e and web server 206c. The communication events between nodes may be referred to as messages. From a collection of messages that are exchanged between the nodes (often referred to as a "message trace"), one or more subsets of this collection of messages may each form a causal path. For example, dashed line 232 illustrates a hypothetical causal path pattern, or alternatively a single instance of such a pattern. An algorithm may be employed (e.g., by inferring logic 14 of FIG. 1) to analyze a trace of such messages and thereby infer the presence of one or more causal paths in that trace. Inferring a causal path is generally based on an assumption that there is some causality between messages sent to and from a given node. For example, a message directed to a first node may result in one or more messages being sent from the first node to one or more other nodes. Exemplary techniques for inferring such a causal path are described further herein.

The exemplary causal path 232 of FIG. 2A represents a possible scenario in which client 202e sends a message to web server 206c (tier-1 node). In response, web server 206c sends a message to authentication server 210c (tier-2 node), which in turn sends a message to database server 214d (tier-3 node). Database server 214d responds with a message back to authentication server 210c, which returns a message to web server 206c. Web server 206c sends a message to application server 210b, which in turn sends a message to application server 210a, which in turn sends a message to database server 214a. Messages are then sent back up the tiers from database server 214a to application server 210a; from application server 210a to application server 210b; from application server 210b to web server 206c; and from web server 206c to client 202e. It will be appreciated that multiple causal path patterns may be inferred from an input set of messages between nodes, even though only one causal path pattern is illustrated in the example of FIG. 2A.

The input set of messages (message trace) from which causal paths may be inferred may be compiled from a number of sources, for example, passive network monitoring (for communication edges that flow between computers), also known as packet capture or "packet sniffing," kernel instrumentation, middleware instrumentation, use of an interposition library on socket API calls, or even application instrumentation, as examples. Any such technique may be employed, for example, at trace capture logic 12 of FIG. 1 to capture message trace 13 for analysis by logic 14.

The information of interest in the message traces generally includes a timestamp, a source identifier, and a destination identifier. The timestamp indicates the time at which the message was sent, the source identifier indicates the node from which the message was sent, and the destination identifier indicates the node to which the message was sent. The timestamps of different source nodes (sources for brevity) need not have the same time reference. In some distributed computing systems, the collecting of message traces may be distributed along nodes of the system so that different sources are monitored by different entities having local clocks. These clocks need not be synchronized with each other, the clocks need only have approximately the same rate, which is the case if they accurately measure intervals of real time.

FIG. 2B is a graph of the exemplary causal path pattern 232 from FIG. 2A. Each of the vertices is labeled with the reference number of the represented node from FIG. 2A. For example, the first vertex in the graph is client node 202e. As shown, a causal relation between messages sent from client 202e to web server 206c and other messages sent from web server 206c to authentication server 210c is inferred from the message traces. As further shown, the message traces may be analyzed to infer the illustrated causal relation between messages sent from web server 206c to authentication server 210c and messages sent from authentication server 210c to database server 214d.

That is, the message trace set (i.e., set of messages between the nodes) may be analyzed to infer the causality of communication in the distributed computing environment, thereby generating a set of causal path patterns showing how repeated activity in the distributed system follows certain paths. Whether a causal relation is inferred between messages from a source node to a destination node and messages arriving at the source node may depend on a probability distribution as described further herein. Exemplary techniques for inferring a causal path or causal path pattern from message traces are described further below. The inferred causal paths are preferably annotated with information identifying how much time is spent in each traversal of each node. Note that on a given causal path, a single node might be traversed once or more than once. These causal paths could also be annotated with additional information, such as the amount of time spent traversing the link between two nodes. Causal path patterns can be annotated with aggregate information, such as the average time spent in each node traversal, or a histogram of such times, and/or various other information concerning the nodes of the causal path.

In general, causal path analysis takes the logical messages of a message trace and looks for causal relationships. In certain embodiments of the present invention, an inferring algorithm is employed to analyze the messages and output a collection of path patterns, each annotated with one or more scores indicating confidence or importance. One embodiment of an algorithm for inferring causality is referred to herein as the "message-linking algorithm." The message-linking algorithm works with both local-area and wide-area traces, which may be captured using library interposition, a sniffer, or other methods.

As mentioned above, two causal path analysis algorithms, nesting and convolution, are described by M. K. Aguilera et al. in "Performance debugging for distributed systems of black boxes", *Proc. SOSP*-19, Bolton Landing, N.Y., October 2003. The nesting algorithm works only on applications using call-return communication, and can detect infrequent causal paths, albeit with some inaccuracy as their frequency drops. However, messages must be designated as either calls or returns and must be paired before running the nesting algorithm. If call-return information is not inherently part of the trace—which it is not in traces obtained using library interposition or, in most cases, packet sniffing—then trying to guess it is error-prone and is a major source of inaccuracy.

In certain embodiments of the present invention, logic 14 (FIG. 1) employs the "message-linking" algorithm for inferring causal paths as described below. Like nesting (but not convolution), the message-linking algorithm tries to infer the cause, if any, for each message in the trace individually. However, the message-linking algorithm analyzes the distribution of causal delays between all adjacent messages in a path, while nesting only considers the distributions between messages designated as calls. The convolution algorithm, which uses techniques from signal processing, works with any style of message communication, but it runs much slower than nesting or message-linking and is inherently unable to detect rare paths. The message-linking algorithm works with any communication style and is still relatively fast.

According to one embodiment of the present invention, the message-linking algorithm receives a message trace, such as message trace 13 received by logic 14 in FIG. 1. For each message in the trace, the message-linking algorithm attempts to determine if the message is spontaneous or is caused by another message. In many cases, the cause is ambiguous, in which case the message-linking algorithm assigns a probability for the causal link between each parent message into the node and the given child message out of the node. In certain embodiments, the probabilities of the causal links for all parent messages to a given child message sum to one. In certain embodiments, "spontaneous action" is given a probability that is part of the sum of one. In this regard, spontaneous action refers to a child message that has no parent message, but was instead caused by a timer or other action internal to the node rather than by an external message.

Figure 3A:
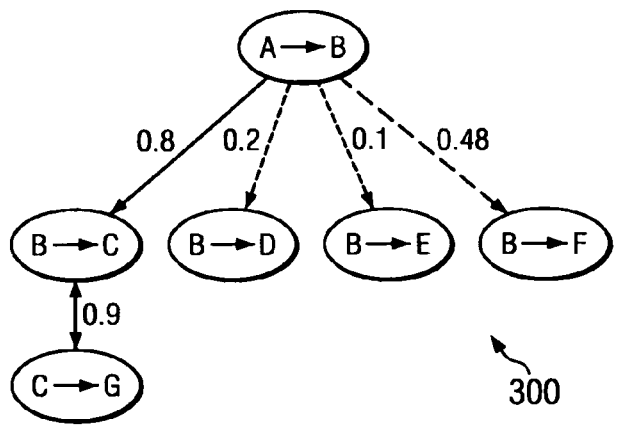
FIGS. 3A-3B show an exemplary link probability tree (FIG. 3A) and the two causal path instances it generates (FIG. 3B) according to one embodiment of an algorithm for inferring causal paths.
Figure 3B:
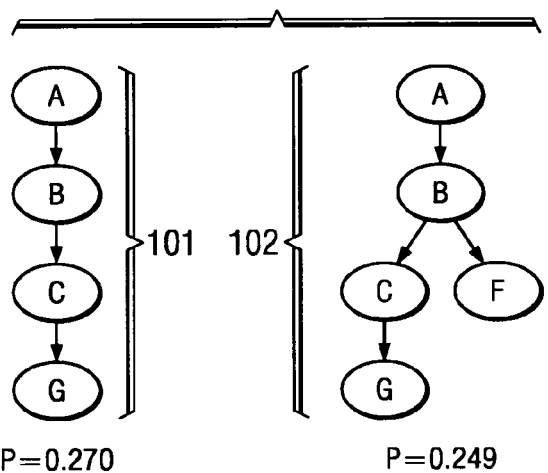

The message-linking algorithm then constructs trees (or "paths") from these causal links and assigns each tree a confidence score that is the product of all of the causal-link probabilities in the tree. The confidence score represents the algorithm's estimate of the number of times the tree appeared in the trace. If a causal link is sufficiently ambiguous (e.g., if it has a probability near 0.5), two trees may be built in certain embodiments, one with the causal link and one without it. FIGS. 3A-3B show an exemplary link probability tree (FIG. 3A) and the two causal path instances it generates (FIG. 3B). The tree 300 in FIG. 3A shows all of the messages that might have been caused, directly or indirectly, by one specific A-to-B message, with a probability assigned to each possible causal link. Exemplary techniques for determining the probability for each causal link according to one embodiment are described further below. In the specific example shown in FIG. 3A, the message-linking algorithm determines that there is a 0.8 (or 80%) probability that message B-to-C was caused by the A-to-B message. That is, there is a 0.8 probability that the B-to-C message is a child of parent message A-to-B. Further, the message-linking algorithm determines that there is a 0.2 probability that message B-to-D was caused by the A-to-B message, a 0.1 probability that message B-to-E was caused by the A-to-B message, and a 0.48 probability that message B-to-F was caused by the A-to-B message. Also, the message-linking algorithm determines that there is a 0.9 probability that message C-to-G was caused by the B-to-C message.

Based on the assigned probabilities, the message-linking algorithm classifies each causal link as either probably-true, probably-false, or try-both. For instance, thresholds may be defined for use in determining in which classification a causal link is to be placed. For example, a threshold of 50% may be defined such that any causal link assigned a probability of greater than such 50% threshold is classified as probably-true; a threshold of 45% may be defined such that any causal link assigned a probability of less than 50% but greater than or equal to 45% is classified as try-both; and a threshold of 44% may be defined such that any causal link assigned a probability of 44% or less is classified as probably-false. Of course, any desired threshold values may be defined in various implementations, and the threshold values to employ any given time may be determined dynamically by the algorithm based on certain factors regarding the message trace under analysis. Further exemplary techniques that may be employed in embodiments of the present invention for classifying causal links as either probably-true, probably-false, or try-both are described below. In tree 300 of FIG. 3A, solid, dotted, and dashed arrows indicate "probably-true," "probably-false," and "try-both" causal links, respectively. From tree 300 of FIG. 3A, the message-linking algorithm generates the two causal path instances 101 and 102 of FIG. 3B, each with a probability based on the decisions made to form it. Here, two trees are generated because the causal link between the message A-to-B and the message B-to-F is classified as "try-both" (because it has probability of nearly p=0.5).

Figure 4:
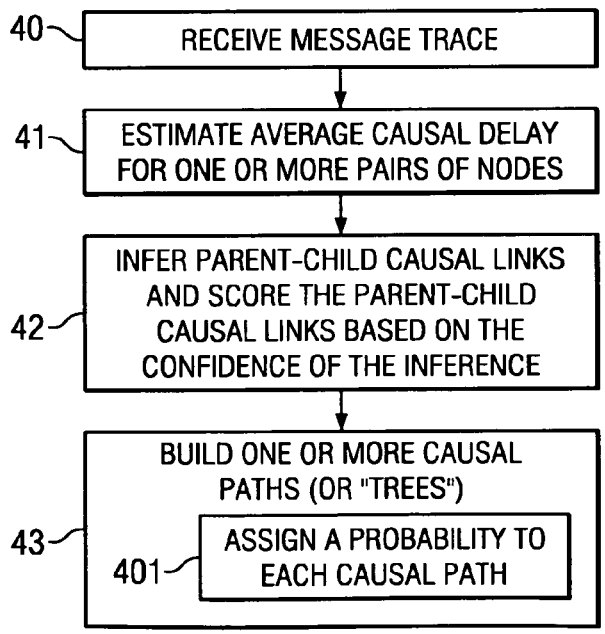
FIG. 4 shows an operational flow of a message-linking algorithm for inferring a causal path according to one embodiment of the present invention.

In general terms, operation of one embodiment of the message-linking algorithm is shown in FIG. 4. In operational block 40, the message-linking algorithm receives a message trace, such as message trace 13 received by logic 14 in FIG. 1. In operational block 41, the message-linking algorithm analyzes the received message trace and estimates the average causal delay for one or more pairs of nodes in the trace. For instance, an average causal delay may be estimated for node A when it communicates to node B (e.g., an average causal delay of operations causing A to send a message to B), for node A when it communicates to node C (e.g., an average causal delay of operations causing A to send a message to C), for node B when it communicates to node C (e.g., an average causal delay of operations causing B to send a message to C), and so on. Techniques that may be employed for estimating the average causal delay of pairs of nodes are described further below.

In operational block 42, the message-linking algorithm infers causal links between parent and child messages and scores the inferred parent-child causal links based on the confidence of the algorithm's inference. For instance, the message-linking algorithm may use the estimated average causal delays for pairs of nodes (the second and third nodes in each causal link) to determine the respective confidence scores for all possible causal links, such as the exemplary causal links of FIG. 3A (e.g. the A-to-B to B-to-C causal link, the A-to-B to B-to-D causal link, etc.). More particularly, the average causal delay may be used to choose a causal delay distribution (e.g., an exponential distribution, etc.) which may be used for analyzing the messages to infer possible parent-child relationships (e.g. based on how well the messages fit the causal delay distribution). Techniques that may be employed for inferring and scoring the causal links are described further below.

In block 43, the message-linking algorithm builds one or more causal paths (or "trees"), such as trees 101 and 102 of FIG. 3B, from the inferred causal links, based on the respective confidence scores of the causal links. For instance, those causal links having relatively high confidence scores may be used in forming one or more overall causal paths. As mentioned above (and shown in the example of FIGS. 3A-3B), if a causal link is classified as try-both, then a plurality of possible overall causal paths may be inferred. As shown in sub-block 401, in certain embodiments the message-linking algorithm assigns an overall probability to each of the inferred causal paths, such as the probabilities 101P and 102P assigned to causal paths 101 and 102 in FIGS. 1 and 3B described above. Each of these operations of this embodiment of the message-linking algorithm are described further below.

Figure 5:
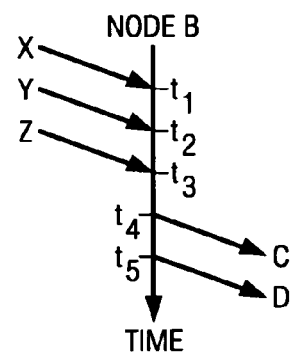
FIG. 5 shows exemplary calls made into a node B and out of the node B according to a message trace under analysis.

As mentioned above, in one embodiment the message-linking algorithm analyzes a received message trace and estimates the average causal delay for one or more pairs of nodes in block 41. The probability of each causal link between a parent message into a node and a child message out of the node is a function of how well it fits the causal delay distribution. For instance, FIG. 5 shows an example of messages received by a node B and sent from node B, which may be determined from a received message trace. In the example shown, node B receives a message from node X at time $t_1$, receives a message from node Y at time $t_2$, and receives a message from node Z at time $t_3$. Thereafter, node B sends a message to node C at time $t_4$, and sends a message to node D at time $t_5$.

Causal delays represent the service times at each node. Therefore, as is common in system modeling, one embodiment of the message-linking algorithm fits the causal delays to an exponential distribution $f(t)=Le^{-Lt}$, where L is a scaling parameter to be found, t is time delay, and e is the natural number e, such that the natural logarithm of e is 1 (i.e., ln(e)=1). Such exponential distribution may be determined independently for each node-to-node pair. For instance, with reference to FIG. 5, such exponential distribution may be determined for each B-to-C pair of nodes by estimating the average delay $d_{B\text{-}to\text{-}C}$ that node B waits before sending a message to node C. The delay distribution scaling factor $L_{B\text{-}to\text{-}C}$ is equal to $1/d_{B\text{-}to\text{-}C}$. Similarly, an exponential distribution may be determined for each B-to-D pair of nodes by estimating the average delay $d_{B\text{-}to\text{-}D}$ that node B waits before sending a message to node D. The delay distribution scaling factor $L_{B\text{-}to\text{-}D}$ is equal to $1/d_{B\text{-}to\text{-}D}$.

Correctly determining the average delays $d_{B\text{-}to\text{-}C}$ and $d_{B\text{-}to\text{-}D}$ requires accurate knowledge of which message caused which; and thus, this embodiment of the message-linking algorithm only approximates $d_{B\text{-}to\text{-}C}$ and $d_{B\text{-}to\text{-}D}$ and hence the scaling parameters $L_{B\text{-}to\text{-}C}$ and $L_{B\text{-}to\text{-}D}$. Considering, for example, the message B-to-C, the message-linking algorithm estimates $d_{B\text{-}to\text{-}C}$ as the average of the smallest delay preceding each message. That is, for each message B-to-C, it finds the latest message into B that preceded it and includes that delay in the average. If there is no preceding message within a given threshold time (e.g., x seconds), B-to-C is assumed to be a spontaneous message (e.g., was not caused by a message from another node) and no delay is included. The value x of this threshold should be longer than the longest real delay in the trace.

In FIG. 5, the most immediate previous message to node B prior to the message B-to-C (which occurs at time $T_4$) is the Z-to-B message occurring at time $T_3$. As for the B-to-D message occurring at time $t_5$, the most immediate previous message received by node B is also message Z-to-B at time $T_3$. In one embodiment of the message-linking algorithm, an average causal delay for the node pairs B&C and B&D found in the received message trace may be determined. More particularly, the message-linking algorithm computes $t_4-t_3$ and the resulting difference (time delay) is averaged with the time delays preceding other B-to-C messages found in the received message trace to arrive at an average causal delay for the node pair B&C. Similarly, the message-linking algorithm computes $t_5-t_3$ and the resulting difference (time delay) is averaged with the time delays preceding other B-to-D messages found in the received message trace to arrive at an average causal delay for the node pair B&D.

In the presence of high parallelism, the estimate for each causal delay d may be too low, because the true parent message may not be the most recent one. However, when the message-linking algorithm employs an exponential distribution, the ranking of possible parents for a message is preserved even when d and L are wrong.

The call delays at one or more nodes may not fit an exponential distribution. In particular, the exponential distribution always assigns higher probabilities to shorter delays, which makes the algorithm less vulnerable to incorrect values of the scaling parameter L but might not accurately represent the most likely delays for all applications. Another exemplary distribution that may be used for certain nodes is $f(t)=tLe^{-Lt}$ which assigns the highest probabilities to delays near d. This distribution appears to perform better only when the estimates for d (and L) are good and much worse otherwise. Of course, in certain embodiments the message-linking algorithm may be implemented to select from the above or any other distributions dynamically, on a per-node basis. This selection may be performed based on detecting certain factors in a message trace. Choosing between distributions may be done, for example, by fitting the actual data to several candidate distributions (e.g., a least-squares curve fit), as described further below.

Once the average causal delays for all communicating pairs of nodes in a trace are estimated (in operational block 41 of FIG. 4), one embodiment of the message-linking algorithm infers parent-child causal links and scores those parent-child causal links based on the confidence of the algorithm of each causal link (in block 42 of FIG. 4). Thus, once the average causal delays are estimated, the algorithm next analyzes messages in the message trace to infer parent-child relationships. In the above example, the immediately preceding received message is used for estimating the average delay of a given pair of nodes. For instance, with reference to FIG. 5, the Z-to-B message received at time $t_3$ immediately precedes the B-to-C message that time $t_4$, and thus the time delay $t_4-t_3$ is used in computing the average causal delay for operations causing messages from B to C. Of course, if there exist other B-to-C messages in the message trace under analysis, the immediately preceding message of each of those other B-to-C messages are likewise used in computing a time delay and the average of the time delays preceding the B-to-C messages is computed. Such average time delay is then used for scaling a distribution (e.g. an exponential distribution) that is used for all possible causal links in which the child message is sent by B and received by C, as described further below. Similarly, with reference to FIG. 5, the Z-to-B message received at time $t_3$ immediately precedes the B-to-D message that time $t_5$, and thus the time delay $t_5-t_3$ is used in computing the average causal delay for operations causing messages from B to D. Of course, if there exist other B-to-D messages in the message trace under analysis, the immediately preceding message of each of those other B-to-D messages are likewise used in computing a time delay and the average of the time delays for the B-to-D messages is computed.

Accordingly, in one embodiment the message-linking algorithm uses the immediately preceding message for estimating the average causal delay of a given pair of nodes in operational block 41. However, the message-linking algorithm does not limit its consideration to the immediately preceding messages when inferring parent-child relationships in operational block 42. Rather, the message-linking algorithm may consider a number of preceding messages in inferring likely parent-child relationships. In certain embodiments, the algorithm does not, however, look indefinitely back in time evaluating preceding messages that may be parents of a given message, such as the B-to-C message in FIG. 5. Rather, a cutoff for analyzing preceding messages is determined, and the message-linking algorithm considers those messages received by a node back to the cutoff time when inferring likely parents of the message under consideration. In certain embodiments, such cutoff is determined based on probability. For instance, a cutoff parameter of 2% may be set wherein the message-linking algorithm considers preceding messages that have a probability of 2% or greater of being a parent to the message under consideration. Thus, the message-linking algorithm may proceed back in time from the time of the message under consideration (e.g., from time $t_4$ when considering the B-to-C message in FIG. 5) and compute for each preceding message received by the sending node of the child message under consideration (e.g., received by node B in the example of FIG. 5, such as the Z-to-B, Y-to-B, and X-to-B messages) the probability that such received message is the parent (or "cause") of the message under consideration until the probability of a preceding message is less than a cutoff threshold, such as 2%. Of course, the cutoff threshold need not be 2%, but may instead be any desired cutoff parameter, and in certain embodiments it may be a variable that can be set by a user and/or dynamically varied by the message-linking algorithm (e.g., based on certain factors detected in the message trace under analysis—for instance, the algorithm may choose another cut-off to balance accuracy and completeness against running time, or to always include some minimum number of possible parent messages).

Thus, in operational block 42, the message-linking algorithm may consider a number of preceding messages received by a node for inferring parent-child causal links and a corresponding confidence score (e.g. probability of accuracy) for each causal link. For instance, continuing with the above example, after estimating the scaling parameter $L_{B\text{-}to\text{-}C}$ for each communicating pair of nodes B-to-C, the linking algorithm assigns each causal link (e.g., Z-to-B-to-C, Y-to-B-to-C, and X-to-B-to-C) a weight based on its delay. The weight of the causal link between X-to-B and B-to-C in the example in FIG. 5 is set to $f(t_4-t_1)=e^{-LB\text{-}to\text{-}C(t_4-t_1)}$, where $(t_4-t_1)$ is the delay between the arrival of X-to-B and the transmission of B-to-C. Additionally, B-to-C may not have been caused by any earlier message into B, and instead might have been spontaneous. This possibility is given a weight equal to a causal link with delay $y \cdot d_{B\text{-}to\text{-}C}$. (y should be a small constant, such as y=4.) Thus, spontaneous action is the most likely choice only when there are no recent messages into B.

Figure 6:
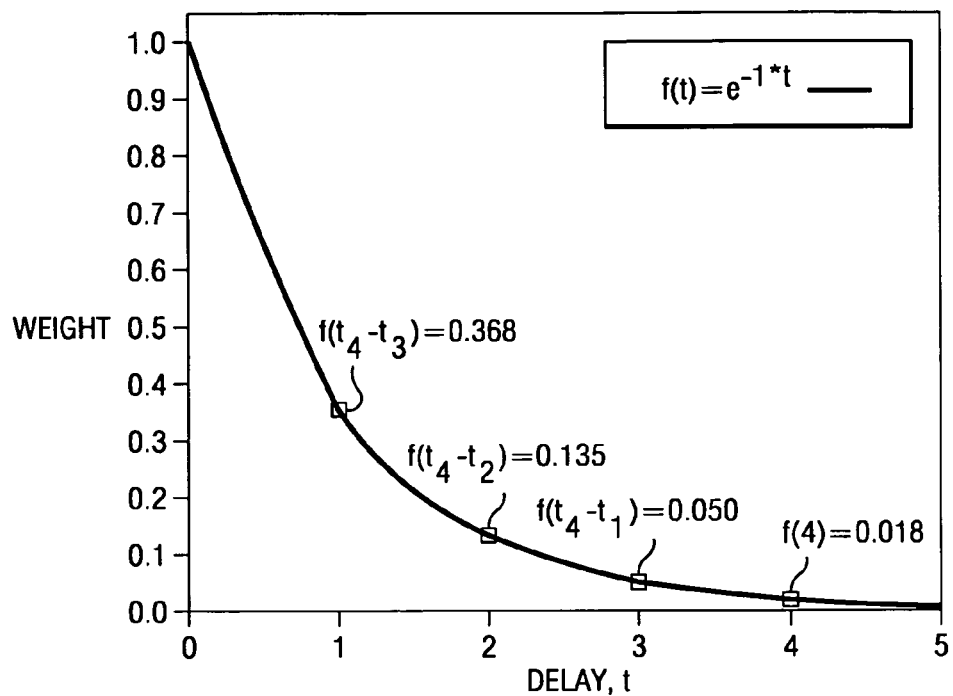
FIG. 6 shows a graph illustrating an exemplary exponential distribution with corresponding weights assigned to all possible parents of the message B-to-C from FIG. 5.

FIG. 6 shows an exemplary exponential distribution with the scaling parameter L set to 1, showing the weights assigned to all possible parents of the message B-to-C from FIG. 5. That is, FIG. 6 shows the weights assigned to all three possible parents of B-to-C (i.e., Z-to-B, Y-to-B, and X-to-B), as well as the weight assigned to the possibility that it occurred spontaneously. In the illustrated example, $f(t_4-t_3)=0.368$ is the unnormalized probability that the Z-to-B message at time $t_3$ caused the B-to-C message at time $t_4$. This causal link has a delay of 1 (because $t_4-t_3=1$) and is assigned a weight of 0.368, according to the exponential distribution. Similarly, $f(t_4-t_2)=0.135$ is the unnormalized probability that the Y-to-B message at time $t_2$ caused the B-to-C message at time $t_4$. This causal link has a delay of 2 (because $t_4-t_2=2$) and is assigned a weight of 0.135, according to the exponential distribution. Similarly, $f(t_4-t_1)=0.050$ is the unnormalized probability that the X-to-B message at time $t_1$ caused the B-to-C message at time $t_4$. This causal link has a delay of 3 (because $t_{4-t1}=3$) and is assigned a weight of 0.050, according to the exponential distribution. In this example, the possibility that the B-to-C message at time $t_4$ was a spontaneous message (not caused by any of the X-to-B, Y-to-B, or Z-to-B messages) is given a weight (0.018 in this example) equal to a causal link with delay $y \cdot d_{B\text{-}to\text{-}C}$, where y=4 in this example.

FIG. 6 models the delays of node B for each possible parent message as a service time distribution, which in this example is an exponential distribution. Thus, the Y-axis (vertical axis) in FIG. 6 corresponds to probability in the distribution, and the X-axis (lateral axis) corresponds to service time delay (i.e., the delay from the time a possible parent message is received by node B until node B sends the message to node C). So, this exemplary distribution defines that the longer delay, the less likely (falling off exponentially) a received message is truly the parent (or "cause") of the B-to-C message. The estimated average causal delay of the B-to-C message, which is computed in operational block 41, is used for scaling the distribution of FIG. 6. There may exist certain systems or communication networks where the average service time is measured in minutes, while others are measured in milliseconds, as examples. And, the measurement (or "scale") to be applied can be determined based on the estimated average causal delay. For example, the scale applied to the distribution for the node pair B&C may differ from that of the node pair B&D (and/or other pairs of nodes). For instance, the scale applied in the distribution of FIG. 6 for the node pair B&C may be in milliseconds (e.g., the X-axis may correspond to milliseconds), while a scale for the distribution of the node pair B&D may be in seconds.

Further, in certain embodiments, the entire distribution curve of FIG. 6 need not be represented, but rather the average causal delay estimated for a given pair of nodes (e.g., B and C) represents the entire curve. That is, a distribution may be provided (e.g., an exponential distribution) and the entire curve of such distribution for a given pair of nodes can be represented by applying the inverse of the node pair's estimated average causal delay as a scaling factor. That is, assuming L is a scaling factor and d is the average delay, then L=1/d. Accordingly, rather than storing values of the entire curve for each pair of nodes, the inverse of each node pair's corresponding estimated average causal delay may be stored for use as a scaling factor in a corresponding distribution to be used for such pair of nodes.

Figure 9A:
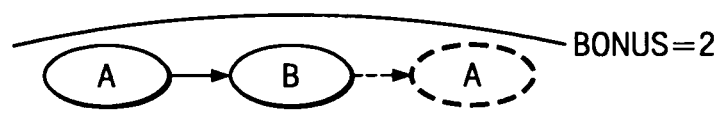
FIGS. 9A-9D show exemplary causal paths with corresponding bonuses for return paths that may be awarded by certain embodiments of the present invention.
Figure 9B:
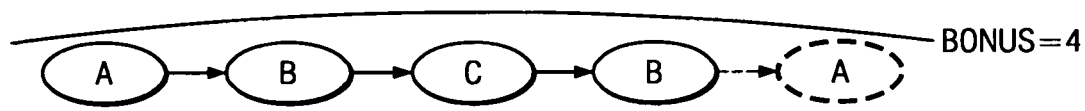
Figure 9C:
Figure 9D:
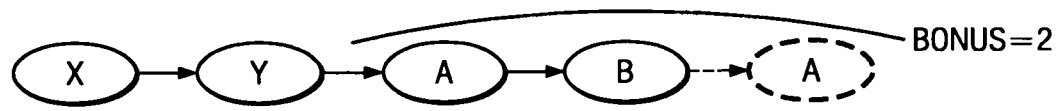

In certain embodiments, a "bonus" in probability may be given for potential return paths. According to one embodiment, the weight for each causal link is multiplied by (1+factor*return_path_length), where "factor" is configurable (and in certain embodiments the default value for factor is 1) and return_path_length is the length of the returned path that the new message would complete. For example, the sequence shown in FIG. 9C linking X-B to B-A would have a return_path_length of 0 (no return), while the sequence shown in FIG. 9A linking A-B to B-A would have a return_path_length of 2 (A-B-A is two messages, one call and one return). The sequence shown in FIG. 9B linking the previously linked sequence A-B-C-B to B-A would have a return_path_length of 4 (A-B-C-B-A is four messages: two calls and two returns). Finally, the sequence shown in FIG. 9D linking the previously linked sequence X-Y-A-B to B-A would have a return_path_length of 2, because the A-B-A at the end of this causal path is a valid call-return pair, regardless of the "prefix" X-Y-Z portion of the path. Of course, whether a bonus is given and/or how much of a bonus is given for potential return paths may be implemented as a configurable parameter that may be configured by a user, the system, etc.

Figure 7A:
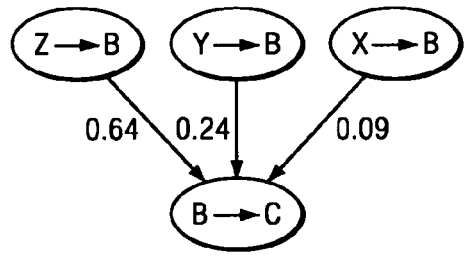
FIGS. 7A and 7B show the possible parents for the B-to-C and B-to-D messages of FIG. 5, respectively, with their assigned probabilities.
Figure 7B:
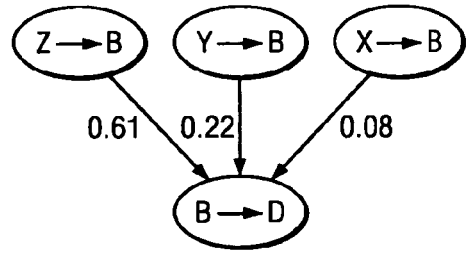

Continuing with the above example being discussed with FIG. 6, once all of the possible parents for this B-to-C message have been enumerated, the weights of their causal links are normalized to sum to 1. These normalized weights become the probability for each causal link. FIGS. 7A and 7B show the possible parents for the B-to-C and B-to-D messages, respectively, with their assigned probabilities. The probabilities shown in each of these FIGURES do not add up to 1 because there is also the possibility that the message is spontaneous. In FIG. 7A, message Z-to-B is assigned a 0.64 probability of being the cause (or "parent") of the B-to-C message; message Y-to-B is assigned a 0.24 probability of being the cause of the B-to-C message; and message X-to-B is assigned a 0.09 probability of being the cause of the B-to-C message. In FIG. 7B, message Z-to-B is assigned a 0.61 probability of being the cause of the B-to-D message; message Y-to-B is assigned a 0.22 probability of being the cause of the B-to-D message; and message X-to-B is assigned a 0.08 probability of being the cause of the B-to-D message.

Hosts or processes that were not traced generate nil timestamps in the reconciled trace. That is, if node A was traced and B was not, then A-to-B messages will be present with send timestamps but not receive timestamps, and B-to-A messages will have only receive timestamps. Both estimating $d_{B-to-A}$ and assigning possible parents to B-to-A rely on having timestamps at B. In this case, we use A's timestamps in place of B's and only allow causality back to the same node: A-to-B-to-A but not, for example, A-to-B-to-C. This assumption accommodates clock skew while allowing calls from or to nodes outside the traced part of the system.

Figure 8A:
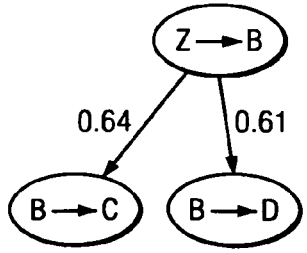
FIGS. 8A-8C show parent-child trees that are derived as inversions of the trees of FIGS. 7A-7B.
Figure 8B:
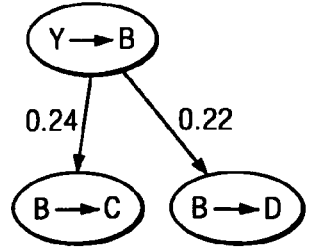
Figure 8C:
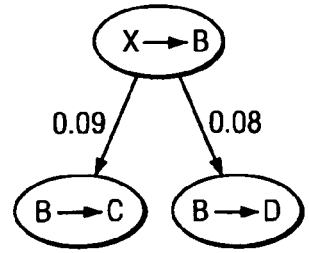

After enumerating and weighting all possible parents for each message, the linking algorithm uses these causal links to generate a list of the possible children for each message, preserving the causal-link probabilities. This inversion is performed because causal trees are built from the root down. For instance, the exemplary parent-child trees of FIGS. 8A-8C are derived as inversions of the trees of FIGS. 7A-7B.

The message-linking algorithm then, in operational block 43 (of FIG. 4), builds and aggregates causal paths (or "trees") from the individual causal links inferred in block 42 (of FIG. 4). For instance, if in block 42 the message-linking algorithm finds the relationships 300 shown in FIG. 3A, it would generate the two causal trees 101 and 102 shown in FIG. 3B, with the following probabilities:

$$P_1=0.8\times(1-0.2)\times(1-0.1)\times(1-0.48)\approx 0.270$$

$$P_2=0.8\times(1-0.2)\times(1-0.1)\times 0.48\approx 0.249$$

For each causal link in the tree (e.g., did A-to-B cause B-to-C?), the message-linking algorithm in operational block 43 treats such causal link as probably-false, probably-true, or try-both, based on its respective probability. In one embodiment, causal paths are designated try-both if their probability is close to 0.5 or if they represent one of the most likely causes for a given message. For instance, in FIGS. 3A-3B, if A-to-B is the most likely cause of B-to-D, then the A-to-B-to-D causal link will be made a "try-both" even though its probability is not near 0.5, ensuring that at least one cause of B-to-D is considered even if each possible cause has probability p<0.5. The number of trees generated from a given root message can be as high as $2^k$, where k is the number of ambiguous causal links from that message or its descendants that are treated as try-both. Therefore, in this exemplary embodiment, k should be limited to bound the running time of the message-linking algorithm.

In one embodiment, the message-linking algorithm assigns a probability to each causal path equal to the product of the probabilities of the individual decisions—using (1−p) for probably-false decisions—made while constructing it. If a specific tree is seen several times in analyzing a trace, the message-linking algorithm, in certain embodiments, keeps track of the total score (i.e., the expected number of times the pattern was seen) and the maximum probability. Path patterns in the output may be ordered by total score, by maximum probability, or by other metrics.

Big trees will generally have low scores because more decisions (more uncertainty) goes into creating them. This behavior is expected. If it is not desirable, linking can normalize scores by using the geometric mean of probabilities of all decisions used to form the tree rather than the product. Doing so eliminates tree size as a factor in the resulting scores, but it means that the resulting score is no longer a valid probability. Such normalization may be helpful in traces with high parallelism and a low variety of true causal paths, as examples.

A system with many nodes may have paths that are similar but not identical. For example, content-distribution networks have thousands of clients making requests; trees starting at one client would not normally be aggregated with trees starting at another. To alleviate this, in one embodiment the message-linking algorithm designates each TCP or UDP port as fixed or ephemeral and designates each node as a client or a server. A port is fixed if it communicates with many other ports. For example, a node making a DNS request will allocate a source port dynamically (normally either sequentially or randomly), but the destination port will always be 53. Thus, the linking algorithm discovers that 53 is a fixed port because it talks to hundreds or thousands of other ports. A node is considered a server if it uses fixed ports at least some of the time, and a client otherwise. The message-linking algorithm may replace all client node names with a single string "CLIENT" and may replace all ephemeral port numbers with an asterisk before building and aggregating trees. Thus, otherwise identical trees beginning at different clients with different ephemeral source-port numbers can be aggregated.

The latency at each node B is the time between the receive timestamp of the parent message arriving at a node B and the send timestamp of the child message that node B sends. Since both timestamps are local to B, clock skew is not an issue for node latency. For aggregated trees, the message-linking algorithm, in certain embodiments, calculates the average of that node's delays at each instance of the tree, weighted by the probability of each instance. In other embodiments, the message-linking algorithm keeps a histogram of delays in addition to the average.

The network latency of each message is the difference between its send and receive timestamps. These timestamps may be relative to different clocks (if they come from logs taken at different hosts or sniffers), so the resulting latency includes clock skew until the message-linking algorithm estimates it and subtracts it out. In certain embodiments, a filter is used on the output of the message-linking algorithm to approximate pairwise clock skew by assuming symmetric network delays. Accordingly, the results hide clock skew and show symmetric average delays between pairs of hosts.

In certain embodiments, each decision (possible causal relationship, such as A-to-B caused B-to-C) in a link-probability tree (e.g., FIG. 3A) receives a "try-both distance." Up to k decisions with the lowest try-both distances actually get tried both ways. In one embodiment, the try-both distance for a given decision A-to-B caused B-to-C is determined as either ABS(p−0.5)/0.5 or ABS(p−mlp)/mlp, where mlp is the probability of the most likely parent for B-to-C. ABS(p−0.5)/0.5 is applied if mlp>0.5, otherwise ABS(p−mlp)/mlp is applied. In effect, this means that if there exists a dominant possible cause (over 50% probability) for some message, the try-both distances are assigned based on how close each decision is to a toss-up (i.e., 50% probability). If there exists no dominant cause, each try-both distance is assigned based on how close each decision is to the most likely parent.

In certain embodiments, the message-linking algorithm may use an iterative method to estimate the average causal delay in operational block 41 of FIG. 4. That is, the average delay L for each node may be estimated by the message-linking algorithm by repeating operational blocks 41 and 42 for a given node, where each repetition yields a better estimate for L. In the first repetition, a heuristic is used to obtain a first value of L. This heuristic may be the mechanism described above for operational block 41. In subsequent repetition, rather than using that mechanism, the L obtained at the end of the previous repetition is used.

For example, in one embodiment, the message-linking algorithm first executes operational blocks 41 and 42 for a fixed node B and all nodes C such that B communicates with C. By doing so, after the inversion at the end of block 42 (e.g., resulting in FIGS. 8A-8C), the message-linking algorithm obtains for each message A-to-B received at B, a set of possible children of A-to-B—that is, messages sent from node B soon after B received the message A-to-B. For each message A-to-B received at B, and for each child B-to-C of A-to-B, the message-linking algorithm may compute the delay between the receipt of A-to-B and the sending of B-to-C. Those delays are combined in a histogram, representing possible delays between the receipt of a message at B and the sending of a message. The message-linking algorithm, according to this embodiment, next finds the parameter L of the exponential distribution that best fits this histogram, by using some standard curve fitting method, such as least squares. This is a new estimate of L, which is used in block 41 in the next repetition of blocks 41 and 42.

These repetitions may continue until some convergence condition is satisfied. This convergence condition could be checking if the values of lambda (L) of two consecutive iterations differ by at most some threshold value or some threshold percentage. If so, this embodiment of the message-linking algorithm stops the repetitions and proceeds to operational block 43 as described above.

In certain embodiments, the message-linking algorithm may employ a distribution other than exponential for one or more nodes. The above-described iterative method works with distributions other than the exponential. For example, one embodiment of the message-linking algorithm may use a Gaussian distribution, or the distribution $f(t)=tLe^{-Lt}$. Each distribution has one or more parameters that are to be determined for operational block 41. For example, a Gaussian distribution has a mean and variance, while the distribution $f(t)=tLe^{-Lt}$ has parameter L. The iterative method described above can be used to determine those parameters in the same way as described for the exponential distribution: in the first repetition of block 41 for a node B, the algorithm may use some standard heuristic to obtain an initial estimate of the parameter(s). This heuristic could look at all messages arriving and leaving node B no more than T time apart and computing the mean and variance of all possible delays. Or, the message-linking algorithm could guess some constant value regardless of the data, for example choosing 1 for every parameter. The algorithm then executes operational blocks 41 and 42 for node B to obtain a histogram of delays. The algorithm finds the best parameters to get the distribution to fit the histogram and uses those values to repeat operational blocks 41 and 42, until convergence.

In certain embodiments, the message-linking algorithm may be implemented to provide improved handling of long transfers. The message-linking algorithm described above may deal poorly with sequences of many messages in the same direction, e.g., representing a long file transfer. The algorithm may compensate by suppressing all messages except the first in a long transfer, treating long transfers as a single packet. Thus, long transfers may have only two timestamps: when begun by the sender and when begun by the receiver. A more refined approach is to note the beginning, end, and size of the transfer. Doing so allows a more accurate calculation of node delays and also allows estimating the network bandwidth between the two nodes performing the transfer. This improves the calculation of node delays by pairing messages caused by the end of a long transfer with the end time rather than the beginning time. It can calculate the network bandwidth by dividing the size of the transfer by the delay between the beginning and end of the transfer as seen at the receiver. Finally, this implementation of the algorithm may find events caused by the beginning or end of a long transfer, rather than just by the beginning.

In view of the above, certain embodiments of the present invention provide techniques for inferring causal paths, which indicate the structure and timing of processing and communication in a distributed system, from a trace of communication messages without requiring call-return semantics or explicit call-return pairings.

In certain embodiments, the message-linking algorithm infers a set of messages that might have caused an individual message B-to-C in a trace, from a system without instrumentation, by examining a recent subset of the messages into the node B that preceded B-to-C. In certain embodiments, the message-linking algorithm assigns probability values to inferences of message causality, thereby indicating the algorithm's confidence in the inferences. For instance, as described above, in certain embodiments the message-linking algorithm uses common service-time distributions to assign probability values to each individual inference. In certain embodiments, the message-linking algorithm scales a service-time distribution for a given pair of nodes under consideration (e.g., the nodes B and C) using an estimated causal delay for the given pair of nodes. In certain embodiments, the message-linking algorithm chooses the service-time distribution and scale and/or shape parameters to use by iteratively choosing a distribution and parameters and then using them to choose and assign probabilities to possible causal links.

According to certain embodiments, the message-linking algorithm infers causal links between messages to and from nodes that did not trace network communication by using message timestamps from nodes that did trace network communication.

In certain embodiments, the message-linking algorithm allows causal links through non-traced nodes, as long as the first and third nodes in the causal link are the same: e.g., A-B-A but not A-B-C, where B is the non-traced node. A non-traced node is a node where communication is not captured. That is, messages to a non-traced node are only captured at the sending node, and messages from a non-traced node are only captured at the receiving node.

Some embodiments of the present invention can increase the probability assigned to causal paths that include call-return subsequences. A call-return subsequence is a sequence of messages where all message can be arranged into one or more nesting, matched pairs. (A pair of messages matches if one message's sender is the other's receiver, and vice versa; e.g., A-B matches B-A.) For instance, a path of A-B-C-B-A is assigned an increased probability using the above-described techniques, while X-Y-C-B-A gets no increase in its probability.

In certain embodiments, the message-linking algorithm assigns a compound probability value to each full causal path inferred by the algorithm. As described above, the compound probability value is the product of the probabilities of each causal link chosen or rejected in the tree (possibly adjusted for tree size). That is, including in a tree a causal link with probability p multiplies the combined probability of the prior causal links existing in the tree by p. Rejecting a causal link with probability p multiplies the combined probability by (1−p).

In certain embodiments, the message-linking algorithm classifies each possible causal link between two messages A-to-B and B-to-C as "probably true," "probably false," or "ambiguous" (or "try-both") based on its probability. In certain embodiments, the message-linking algorithm promotes some "probably false" causal links between two messages A-to-B and B-to-C to "try-both" status based on the absence of other possible causes for B-to-C. Also, in certain embodiments, the message-linking algorithm prunes the exponential set of possible output paths by limiting the number of "ambiguous" causal links per client request message.

In certain embodiments, the message-linking algorithm accommodates clock skew by maintaining sent-at and received-at timestamps for each message and only comparing two timestamps if they were taken at the same node. In certain embodiments, the message-linking algorithm uses separate node names for causality and aggregation. Further, in certain embodiments, the message-linking algorithm is capable of inferring whether a given port number is fixed or ephemeral based on the number of other distinct port numbers it connects to. Additionally, the message-linking algorithm is capable of inferring whether a host is a client or a server based on its use of fixed ports, in certain embodiments. Further, in certain embodiments, the message-linking algorithm renames all clients and ephemeral port numbers to single strings ("CLIENT" and "*," respectively) to enable aggregation of similar paths with unimportant differences only.

In certain embodiments, the message-linking algorithm maintains summaries of when instances of each path occur to plot path prevalence as a function of time.

In certain embodiments, an uninterrupted series of messages from a single sender to a single receiver may be combined as one "fat message" with four timestamps: sender first message, receiver first message, sender last message, and receiver last message.

In view of the above, it should be appreciated that embodiments of the present invention may be employed for use in inferring causal paths in any "black-box" type of system. That is, embodiments of the present invention may be employed for treating nodes of distributed computing environment as black-box components in that analysis of (or a priori knowledge of) the inner functions of such components or the communication semantics employed for inter-communication of the components is not required for inferring causal paths.

In certain embodiments, the inferring techniques used herein may be employed in combination with other techniques, such as the above-mentioned nesting and/or convolution techniques. For example, both the above-described message-linking algorithm and the nesting algorithm may be employed and their respective results may be analyzed/compared for aiding in properly inferring causal paths. Further, different causal path inferring techniques may be employed for different types of nodes and/or communication patterns. For instance, the nesting algorithm may be better suited for inferring causal paths in certain instances, while the message-linking algorithm may be better suited for inferring causal paths in other instances; and by using a combination of such algorithms accuracy may be improved in inferring causal paths of a given system.

What is claimed is:

1. A method comprising:
receiving, by logic for inferring a causal path, a trace of communication messages between nodes in a distributed computing environment;
evaluating, by said logic, said trace of communication messages to infer at least one causal path, wherein said evaluating does not require that said communication messages adhere to call-return semantics;
based on timing relationship of said messages, said logic determining probability of a causal link between pairs of said messages; and
based on said determined probabilities, said logic forming at least one causal path comprising a plurality of causal links.

2. The method of claim 1 wherein said determining probability of a causal link between pairs of messages comprises:
determining probability of a causal link between a pair of messages from a first node to a second node and later from said second node to a third node, wherein said logic estimating an average causal delay for said second node.

3. The method of claim 2 wherein said estimating an average causal delay comprises:
said logic determining, for each occurrence of said message from said second node to said third node in said messages, an amount of delay from receipt of an immediately preceding message by said second node to the transmission of a message from said second node to said third node; and
said logic averaging the determined delays to estimate said average causal delay for said pair of second and third nodes.

4. The method of claim 3 further comprising:
said logic using said average causal delay to parameterize a service time distribution for said pair of second and third nodes.

5. The method of claim 4 wherein said determining probability of a causal link between said pair of messages comprises:
said logic assigning a probability to each potential causal link found in said trace of communication messages based on the parameterized service time distribution for said pair of second and third nodes in said causal links.

6. The method of claim 1 further comprising:
determining by said logic, an overall probability that said at least one causal path is accurate.

7. The method of claim 6 wherein said determining an overall probability comprises:
determining, by said logic, said overall probability as a product of probabilities of said plurality of causal links included in the at least one formed causal path.

8. The method of claim 1 wherein said forming at least one causal path comprises:
classifying by said logic, each causal link as probably true, probably false, or try-both, wherein said classifying is based at least in part on said determined probability of said causal link.

9. The method of claim 8 wherein said forming at least one causal path further comprises:
including, in a formed causal path, said causal links classified as probably true; and for each causal link classified as try-both, forming a first causal path that includes such try-both causal link and forming a second causal path that does not include such try-both causal link.

10. Computer-executable software code stored to a computer-readable medium, said computer-executable software code comprising:
code for evaluating messages between nodes of a distributed computing environment;
code for determining, based on timing relationships of said messages, probability of a causal link between one or more pairs of said messages;
code for inferring, based on said determined probability, at least one causal path comprising a plurality of causal links; and
code for presenting said at least one causal path and a corresponding indication of confidence in the accuracy of each of the at least one inferred causal path.

11. The computer-executable software code of claim 10 wherein said code for presenting an indication of confidence comprises:
code for presenting, for each of the at least one inferred causal path, a respective probability that such inferred causal path is accurate.

12. The computer-executable software code of claim 1 further comprising:
code for determining, for each of the at least one inferred causal path, said respective probability that such inferred causal path is accurate.

13. The computer-executable software code of claim 12 wherein said code for determining said respective probability comprises:
code for determining said respective probability of such inferred causal path as a product of determined probabilities of said plurality of causal links included in such inferred causal path.

14. The computer-executable software code of claim 10 wherein said code for determining probability of a causal link between one or more pairs of said messages comprises:
code for estimating an average causal delay for said causal link.

15. The computer-executable software code of claim 14 wherein said code for estimating an average causal delay comprises:
code for determining, for each occurrence of said causal link in said messages, an amount of delay between receipt of an immediately preceding message sent by a first node and received by a second node, and transmission of a message from said second node to a third node; and
code for averaging the determined delays to estimate said average causal delay for said second node.

16. The computer-executable software code of claim 15 further comprising:
code for determining parameters for a service time distribution for said pairs of second and third nodes based on said average causal delay estimated for said pairs of second and third nodes.

17. The computer-executable software code of claim 16 wherein said service time distribution is an exponential distribution.

18. The computer-executable software code of claim 16 wherein said code for inferring comprises:
code for assigning a probability a potential causal link found in said messages based on the parameterized service time distribution for said pair of second and third nodes in said potential causal link.

19. The computer-executable software code of claim 18 wherein said code for assigning probabilities increases the probability of a plurality of causal links according to a parameterized function of length of a call-return path said causal links complete.

20. The computer-executable software code of claim 10 wherein said code for inferring comprises:
code for classifying a causal link as probably true, probably false, or try-both.

21. The computer-executable software code of claim 20 wherein said code for classifying performs said classifying based at least in part on said determined probability of said causal link.

22. The computer-executable software code of claim 20 wherein said code for inferring comprises:
code for including said causal links classified as probably true in an inferred causal path; and
code, responsive to each of the said causal links classified as try-both, for inferring a first causal path that includes such try-both causal link and inferring a second causal path that does not include such try-both causal link.

23. The computer-executable software code of claim 10 wherein said code for inferring does not require that said nodes of said distributed computing environment adhere to call-return semantics for communicating with each other.

* * * * *